(No Model.)
S. H. HYDE.
COMBINED JACK AND WEIGHING SCALE.
No. 268,797. Patented Dec. 12, 1882.
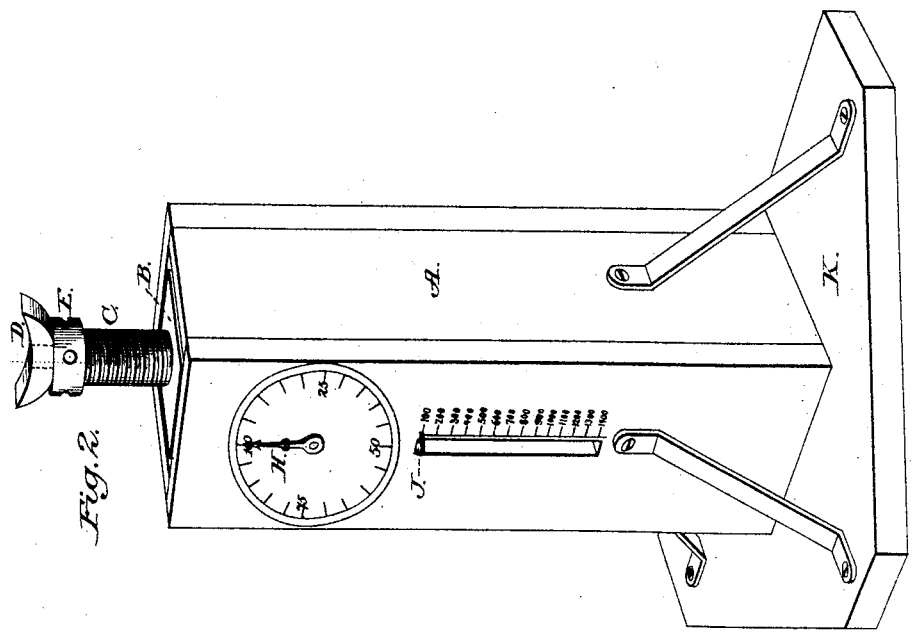
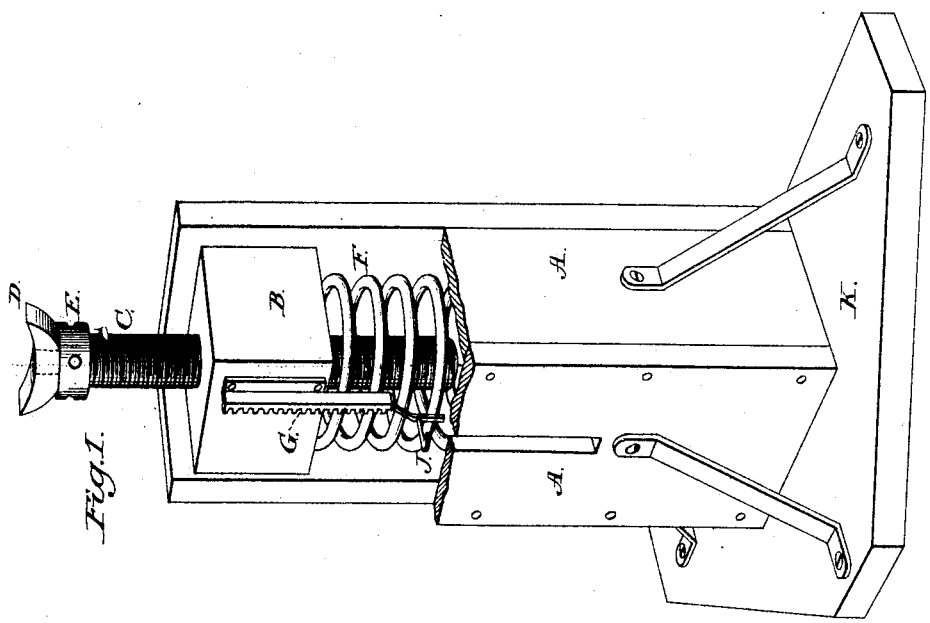
Witnesses:
John A. Ellis.
J. F. Acker.
Inventor:
Stephen H. Hyde
By David A. Burr
Attorney.

UNITED STATES PATENT OFFICE.

STEPHEN H. HYDE, OF ALPINE, NEW JERSEY.

COMBINED JACK AND WEIGHING SCALE.

SPECIFICATION forming part of Letters Patent No. 268,797, dated December 12, 1882.

Application filed March 13, 1882. (No model.)

*To all whom it may concern:*

Be it known that I, STEPHEN H. HYDE, of Alpine, in the county of Bergen and State of New Jersey, have invented a certain new and useful Combined Jack and Weighing Scale; and I do hereby declare that the following is a full, clear, and exact description thereof, reference being had to the accompanying drawings, and to the letters of reference marked thereon, making a part of this specification.

This invention relates to a portable device for weighing heavy loads.

It has for its object the weighing of a wagon, or a movable frame or platform loaded with hay or other merchandise, without recourse to the expensive stationary platform-scales heretofore employed for the purpose; and it consists in the construction and use of a series of screw-jacks adapted to raise and support the load to be weighed, having spring-scales combined therewith, so that the weight of the load when lifted by the jack shall rest upon and be supported by the spring scale or balance, whose index will indicate the exact weight thus lifted and upheld.

In the accompanying drawings, Figure 2 is view in perspective of my improved jack-scale, and Fig. 1 a similar view with a portion of the casing of the scale broken away to expose to view the balance-spring and the connection of the lifting-jack therewith.

A is the outer case, inclosing the spring and jack. Within this case, which may be cylindrical or rectangular, is fitted a follower, B, carrying a central jack-screw, C, which works or screws through the follower as through a nut. The upper end of the jack-screw C is fitted with a head-block, D, turning loosely thereon, and with a collar, E, perforated to receive the end of a hand bar or lever by which the screw C may be turned. The follower B rests upon and is wholly supported by a strong, well-tempered, spiral spring, F, and a toothed bar or rack, G, is secured to the side of the follower and adapted to engage a pinion upon the spindle of an index-hand, H, rotating over the face of a graduated dial on the outer face of the case. A pointer, J, is also fitted to the lower end of the rack-bar G to project through a slot in the case and traverse over a scale formed on the edge of said slot. The scale along the slot is graduated to indicate the depression of the spring by the weight of hundreds of pounds, and the revolution of the index-hand over the dial is adapted to denote the intermediate movement of the spring under the influence of pounds and tens of pounds.

The spring-case A is supported and braced upon a suitable base-plate, K, and the whole device is made light, strong, and portable to admit of ready transportation, and yet be capable of lifting and weighing heavy loads.

In use the device is placed under the axle of a wagon, or otherwise under the load to be weighed, and the jack-screw is turned up by means of a hand lever or rod inserted in the holes in the collar E until the weight of the load is brought to bear wholly upon the spring F. In weighing a wagon-load one of these jack-scales is placed under the outer end of each of the axles, and when the entire load has been lifted to rest upon the four springs the weight indicated by each is noted, and the sum thereof will give the weight of the entire load as accurately as it is measured upon a platform-scale.

By means of this invention farmers and others are enabled thus to weigh stacks or loads of hay or other produce or merchandise, wherever located, without the expense and inconvenience attendant upon the necessity of carrying the load to a stationary platform-scale.

It is evident that levers may be substituted for the screw, in combination with the spring F, for lifting and transmitting or transferring the weight of the load to the spring, and I contemplate such equivalent devices.

I claim as my invention and desire to secure by Letters Patent—

1. In a portable weighing apparatus, the combination of a jack-screw with a spring-balance adapted to support the screw and to indicate the weight of the load uplifted thereby, substantially in the manner and for the purpose herein set forth.

2. The combination, in a weighing device, with an inclosing case, A, and base-plate K, of a spiral spring, F, a follower, B, resting thereon, a jack-screw, C, working through said follower, and one or more pointers adapted to indicate upon a scale or dial the depression of the follower under the weight of a load resting upon the screw, substantially in the manner and for the purpose herein set forth.

In testimony whereof I have signed my name to this specification in the presence of two subscribing witnesses.

STEPHEN H. HYDE.

Witnesses:
 DAVID A. BURR,
 JOHN A. ELLIS.